United States Patent [19]
Gartner et al.

[11] 3,930,582
[45] Jan. 6, 1976

[54] SYSTEM FOR TESTING PAPER MONEY AND THE LIKE

[75] Inventors: Fritz Gartner; Erich Berger, both of Vienna, Austria

[73] Assignee: Oesterreichische National Bank, Vienna, Austria

[22] Filed: May 17, 1974

[21] Appl. No.: 470,965

[30] Foreign Application Priority Data
May 18, 1973 Austria .............................. 4387/73

[52] U.S. Cl. ............. 209/88; 209/DIG. 2; 340/259; 235/92 SB; 235/61.11 K
[51] Int. Cl.² ............................................. B07B 1/15
[58] Field of Search ......... 209/88, 82, DIG. 2, 88 S; 271/262, 263; 340/259; 73/159, DIG. 4; 33/174 L; 235/61.11 K, 92 SB

[56] References Cited
UNITED STATES PATENTS

| | | | |
|---|---|---|---|
| 3,417,476 | 12/1968 | Martens | 209/88 R |
| 3,581,402 | 6/1971 | London et al. | 33/174 |
| 3,590,992 | 7/1971 | Soderstrom | 209/88 R |
| 3,759,095 | 9/1973 | Short, Jr. | 73/159 |
| 3,778,051 | 12/1973 | Allen | 235/92 SB |
| 3,842,668 | 10/1974 | Lippke | 73/159 |

*Primary Examiner*—Allen N. Knowles
*Attorney, Agent, or Firm*—Karl F. Ross; Herbert Dubno

[57] ABSTRACT

To test the genuineness and/or condition of dollar bills or other substantially identical papers, one or more thickness gauges are positioned in the path of these papers and determine the deviations, if any, of the thickness of a passing specimen from a predetermined value or from the thickness of a reference specimen scanned concurrently therewith. The measured deviations are fed into a processor which counts positive or negative deviations within a multiplicity of incremental periods and determines the nature of any irregularity from the count of deviations of either sign. With three gauges measuring thickness along as many parallel tracks, the system may discriminate among such irregularities as gaps, overlappings, adhesive tape and dog-eared corners.

24 Claims, 7 Drawing Figures

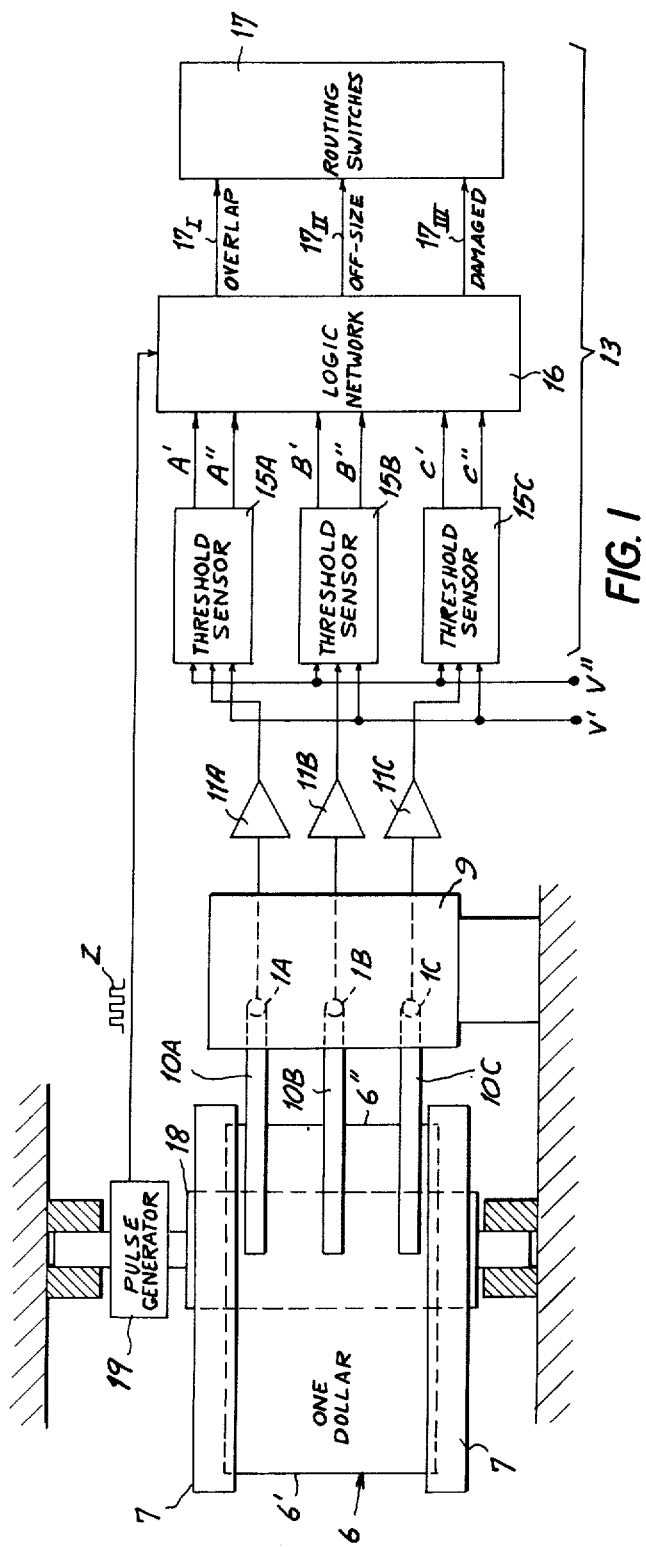
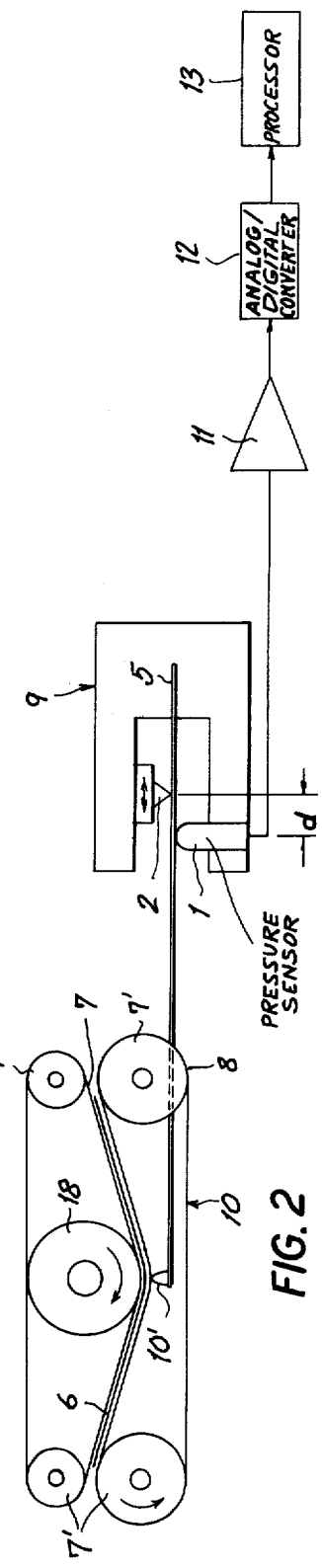
FIG. 1
FIG. 2

SYSTEM FOR TESTING PAPER MONEY AND THE LIKE

FIELD OF THE INVENTION

Our present invention relates to a method of and means for testing specimens of sheet material, such as folding money or documents, against a standard to determine their genuineness and/or their condition.

BACKGROUND OF THE INVENTION

In money-changing machines, for example, it is important to distinguish between genuine and counterfeit bills or notes as well as between normal specimens and defective ones. Thus, it is frequently desirable to return a heavily damaged note to the customer but to retain a presumably counterfeit note in the machine without giving change. Such a sorting of bills or notes is also required in banks, in order to remove defective or suspect specimens from circulation.

Systems have become known in which folding money or other substantially identical papers can be classified by comparing their thickness at certain points with a reference value. Such systems, however, can be rather easily deceived inasmuch as practical considerations limit the number of test points. Thus, for example, adhesive tape may be used to splice nonmatching bill portions together along lines remote from these test points. Such tapes could also be used to mask a gap or tear, with approximation of the standard thickness.

OBJECTS OF THE INVENTION

The general object of our invention is to provide a method of and means for more effectively testing specimens of folding money or the like in a manner avoiding the aforestated drawbacks.

A more particular object is to provide a system of this character enabling discrimination among such defects as off-size (frequently a mark of counterfeit papers), gaps or adhesive tapes, on the one hand, and such minor irregularities as dog-eared corners or overlapping specimens which do not require elimination from circulation.

SUMMARY OF THE INVENTION

We realize these objects, in conformity with our present invention, by successively measuring the thickness of a test specimen at closely spaced locations along one or more scanning lines between opposite edges thereof, namely a leading edge and a trailing edge of the specimen moving relatively to one or more thickness gauges, and classifying the test specimen according to the distribution of positive and negative deviations of its measured thickness from a reference value.

According to a more specific feature of our invention, the test specimen is classified according to the number of positive and/or negative deviations along the scanning line or lines. We prefer for this purpose to correlate the deviations measured along different, parallel scanning lines since this enables us, in a manner more fuly described hereinafter, to distinguish between the various types of irregularities mentioned above.

The reference value may have a constant magnitude, with an upper and a lower tolerance limit, or may vary according to a predetermined law. In particular, this reference value may be derived from a standard specimen scanned concurrently with the test specimen.

According to a further feature of our invention, the closely spaced test points are determined by timing means establishing a succession of incremental periods during a traverse of the thickness gauge or gauges from the leading to the trailing edge of the specimen; the timing means may comprise an emitter of equispaced gating pulses whose count at any instant during a traverse indicates the length of a specimen section already scanned.

According to a more specific feature of our invention, each pressure gauge comprises an electromechanical sensor such as a leaf spring with a clamped end and a free end bearing through a raised formation upon the test specimen, the latter being preferably supported at the point of contact by a rotatable cylinder forming part of a transport mechanism for the specimens which also includes one or more pairs of endless bands sandwiching a narrow zone of the specimen between them. The leaf spring is operatively coupled with a transducer which translates its deflection from a normal position into a bipolar electrical signal. Such a transducer may comprise a piezoelectric element forming one of two abutments which bear upon opposite faces of the leaf spring in the vicinity of its clamped end, the spacing of these abutments in the longitudinal direction of the spring being preferably adjustable. Alternatively, the transducer may include a mirror carried on the leaf spring, an emitter of luminous radiation such as a laser trained upon the mirror, and receiving means such as an interferometer for the radiation reflected by the mirror.

With such a system it is possible to detect not only the attainment or surpassing of certain thresholds but also, if desired, the actual magnitude of the measured thickness between its upper and lower tolerance limits. This latter feature is of particular interest where, for example, a standard specimen is not of uniform thickness but has certain parts (e.g. because of a watermark) which are thinner or heavier than the rest.

BRIEF DESCRIPTION OF THE DRAWING

The above and other features of our invention will now be described in detail with reference to the accompanying drawing in which:

FIG. 1 is a somewhat diagrammatic elevational view of a system embodying our invention;

FIG. 2 is a top plan view of part of the system of FIG. 1;

SPECIFIC DESCRIPTION

Figure 4:
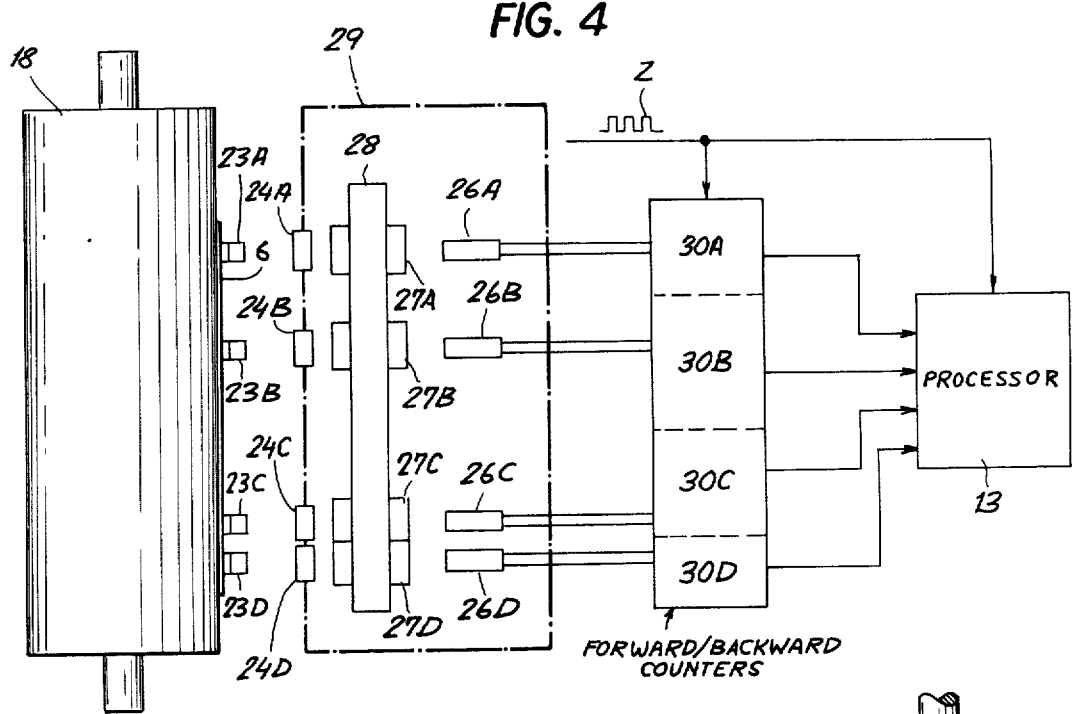
FIG. 4 is an elevational view of the system of FIG. 3, with additional elements shown diagrammatically.

The system shown in FIG. 1 is designed for the testing of paper specimens, such as a dollar bill 6, moving from right to left past a set of three electromechanical pressure gauges represented by respective leaf springs 10A, 10B, 10C collectively designated 10 in FIG. 2, these leaf springs extending parallel to one another in the direction of advancement of bill 6 to scan respective zones of the bill adjacent its longitudinal edges and at its center. The bill is transported between pairs of endless bands or belts 7 which are wound about rollers 7', some or all of these rollers being driven by a nonillustrated electric motor. These bands also engage part of the periphery of a cylinder or drum 18 forming a counterbearing for a bill-contacting tip 10' on the free end of each leaf spring 10, the opposite end of the spring being clamped at 5 in a stationary mounting 9. The mounting supports two abutments 1 and 2 spaced in the longitudinal direction of the spring, their separation $d$ being preferably adjustable as indicated for the abutment 2. Abutment 1, in the embodiment shown in FIG. 2, is a piezoelectric pressure sensor working via an amplifier 11 into an analog/digital converter 12 whose output is delivered to a processor 13, this processor including either a computer or a permanently wired logic matrix; in the latter instance, and as shown in FIG. 1, the converter 12 may be omitted. The counterparts of sensor 1 and amplifier 11, respectively associated with spring 10A, 10B, 10C, have been designated 1A, 1B, 1C and 11A, 11B, 11C in FIG. 1.

The processor 13 shown in FIG. 1 comprises three threshold sensors 15A, 15B, 15C receiving the output signals of amplifiers 11A, 11B, 11C and comparing them with two fixed voltages V' and V" respectively representing the lower and the upper tolerance limit of a reference value which corresponds to the nominal thickness of the specimen 6. Sensor 15A emits a first output signal A' if the measured thickness of test specimen 6 adjacent its upper edge equals or exceeds the lower tolerance limit; it emits a second signal A" if that measured thickness surpasses the upper tolerance limit. In an analogous manner, sensors 15B and 15C emit respective signals B', B" and C', C" according to the thicknesses measured along the centerline and the lower edge of the specimen.

A pulse generator 19, mounted on the shaft of cylinder 18 and driven in synchronism therewith by the same motor which drives some or all of the rollers 7', produces a continuous train of equispaced gating pulses Z which measure successive incremental advances of specimen 6 past the tips 10' of the leaf springs 10. (Alternatively, though somewhat less conveniently, the specimen 6 could be stationary and the pressure gauges represented by the springs 10 could be advanced therealong.) These gating pulses Z effectively subdivide the scanning lines traced by springs 10A, 10B, 10C into a multiplicity of closely juxtaposed locations giving discrete thickness readings. As will be readily understood, the absence of signal A', B', C' or the presence of a signal A", B", C" in the outputs of threshold sensors 15A, 15B, 15C represents a deviation from standard thickness beyond the admissible tolerance, the distribution of these deviations being evaluated in a logic network 16 which classifies successive specimens 6 according to the distribution of their deviations (if any) indicating various types of irregularities. Thus, for example, the absence of signal A', B' or C' indicates a weak spot or, more frequently, a gap in the specimen; the presence of signal A", B" or C" shows excess thickness and may indicate a double layer of paper which could be due to a folded-over portion of the bill (e.g. a dog's-ear) or to an overlap between adjoining specimens. Logic network 16 controls, via respective output leads $17_I$, $17_{II}$ and $17_{III}$, the operation of a set of routing switches 17 which separate normal specimens from overlapping, off-size or heavily damaged ones. A preferred construction of logic network 16 will be described hereinafter with reference to FIG. 7.

Figure 3:
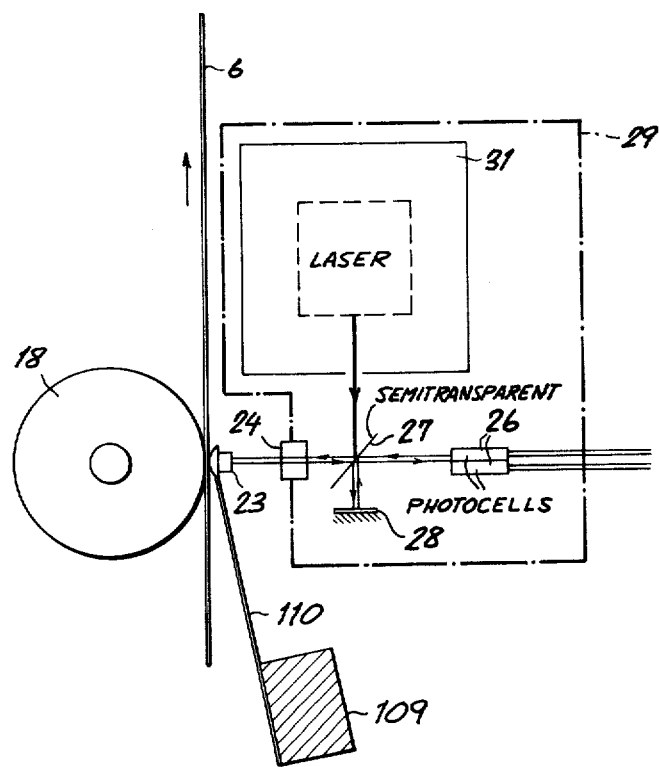
FIG. 3 is a fragmentary view similar to FIG. 2, illustrating a modification.

As shown in FIG. 3, a modified leaf spring 110 mounted on a fixed block 109 carries a mirror 23 at its free end contacting the test specimen 6 opposite the drum 18, this specimen being again transported by pairs of bands or equivalent means marginally engaging same as described above with reference to FIGS. 1 and 2. An emitter of coherent, monochromatic luminous radiation, specifically a laser 31 within an enclosure 29, trains its beam through a semitransparent reflector 27 and through a window 24 of enclosure 29 onto the mirror 23 which reflects that beam back upon itself. The beam thus reflected is superimposed upon the radiation which traverses the semitransparent reflector 27, is returned by a stationary mirror 28 and is once more reflected by element 27 in the direction of the beam returning from mirror 23, i.e., to the right as viewed in FIG. 3, to strike a pair of closely juxtaposed photocells 26. If the relative distances of elements 23, 27 and 28 are such that the reference beam reflected by mirror 28 is in quadrature with the beam returned by mirror 23, the illumination of photocells 26 has an average intensity; if, however, that thickness changes, the reflected beam is superimposed either additively or subtractively upon the reference beam from mirror 28 so that the radiation impinging on photocells 26 is either intensified or dimmed. Thus, the magnitude of the output voltage of photocells 26 is a measure of the thickness of the specimen within a range determined by the wavelength of the monochromatic beam energy. With an He/Ne laser, for example, this wavelength is 632.8 m$\mu$ corresponding to a power of resolution of 0.315$\mu$; thus, a thickness increment of about 0.01 mm yields 32 signal peaks.

FIG. 4 shows four interferometers of the type illustrated in FIG. 3 associated with respective leaf springs carrying mirrors or prisms 23A, 23B, 23C, 23D, aligned with respective windows 24A, 24B, 24C, 24D, these interferometers including individual semitransparent reflectors 27A, 27B, 27C, 27D and a common fixed mirror 28. The associated photocell pairs have been designated 26A, 26B, 26C, 26D. The four leaf springs scan respective lines of specimen 6; the two lowermost interferometers 23C etc. and 23D etc. are used alternatively with specimens of different height. The several pairs of photocells work into respective forward/backward counters 30A, 30B, 30C, 30D which accumulate their emitted pulses as a digital reading of the measured thickness deviations. These counters may be controlled by sign detectors responding to changes in the relative illumination of the two photocells of each pair for ascertaining the sense of the deviation increment, i.e., determining whether the measured thickness of the specimen increases or decreases, to cause the corresponding counters to work either in the forward or in the backward mode. This change in relative illumination indicates whether the small angle included between the reflected beam and the axis of the photocell (unless the specimen happens to be of exactly the prescribed thickness) varies in one sense or the other. Reference in this connection may be made to an article by E. A. Hilton and D. M. Cross, *Laser Brightens the Picture for IC Mask Making Camera*, ELECTRONICS, Vol. 40, No. 16, Aug. 7, 1967, page 119. The counters 30A – 30D are read periodically, under the control of gating pulses Z, to deliver their readings to the processor 13.

Figure 7:
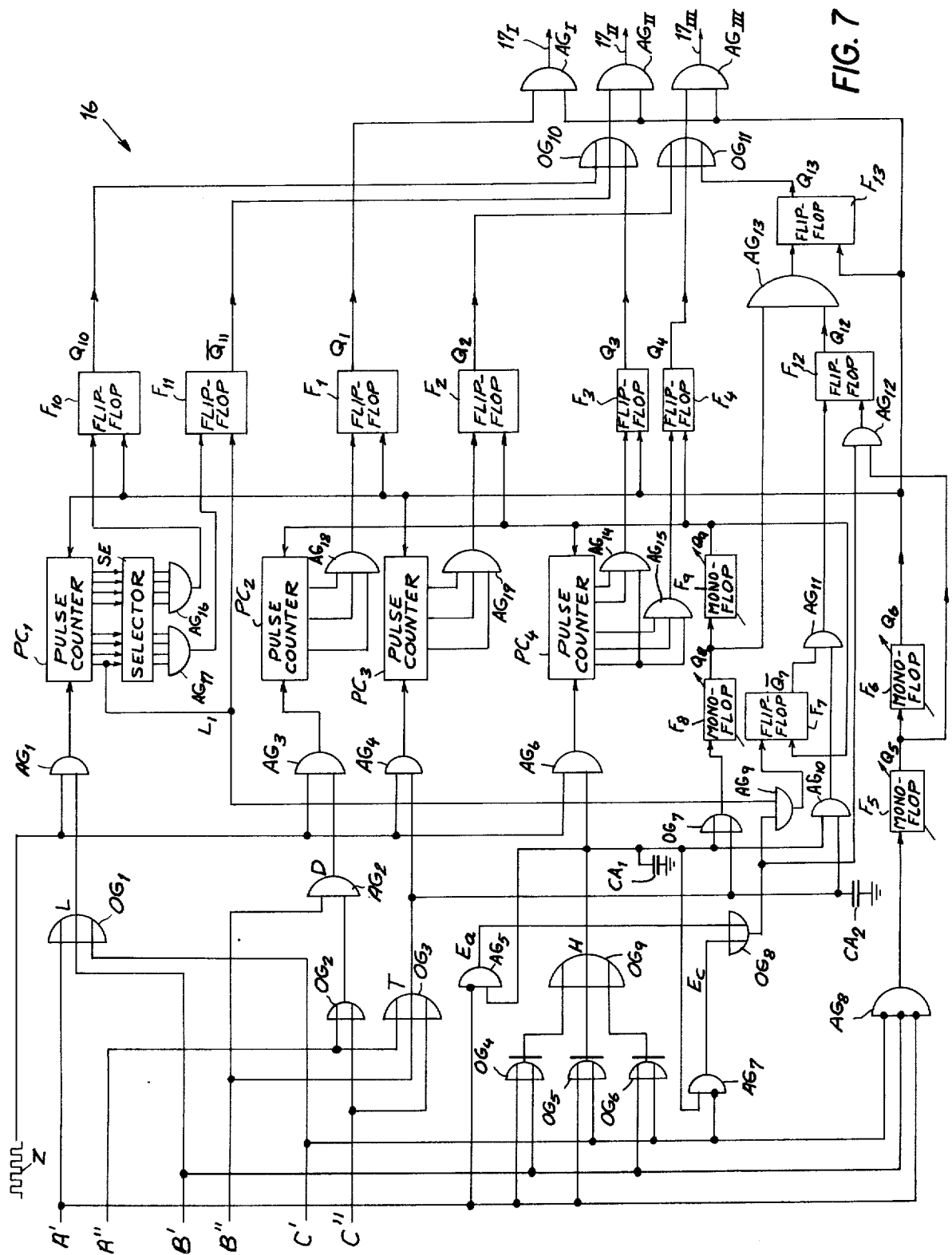
FIG. 7 is a detailed circuit diagram of a logic matrix shown in block form in FIG. 1.

In the system just described, the output of the pressure gauges is directly available in digital form so that no converter 12 (FIG. 2) is needed even if the processor 13 includes a computer rather than a logic network of the type shown in FIGS. 1 and 7.

Figure 5:
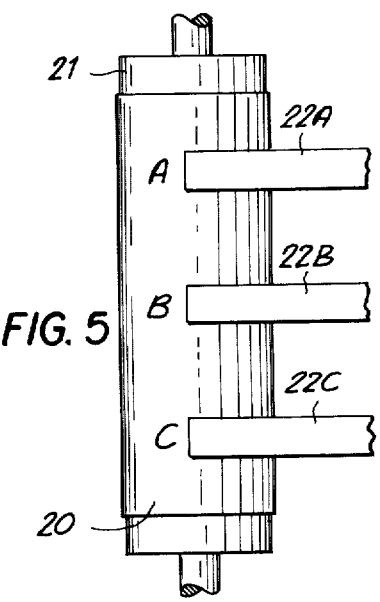
FIG. 5 is an elevational view of a carrier for a standard specimen, adapted to be used with the systems of the preceding FIGURES.
Figure 6:
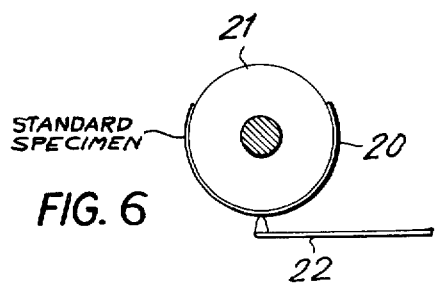
FIG. 6 is a top view of the carrier of FIG. 5.

The digital readings fed into processor 13 by the counters 30A – 30D may be compared with predetermined numerical values or with similar readings obtained by an analogous arrangement from the scanning of a standard specimen 20 as shown in FIGS. 5 and 6. This standard specimen is shown mounted on a drum 21 rotating in synchronism with drum 18 of FIG. 1 and coacting with respective leaf springs 22A, 22B, 22C tracing lines A, B and C corresponding to the scanning lines so designated on specimen 6 in FIG. 1. Thus, a digital comparator within the processor 13 may determine during each scanning interval, i.e., upon the occurrence of each gating pulse Z, the difference (if any) between the readings of counters 30A – 30C and corresponding counters controlled by springs 22A – 22C which have been generically indicated by 22 in FIG. 6.

FIG. 7 shows details of the logic network 16 with its inputs carrying the signals A', A'', B', B'', C', C'' and the gating pulses Z. This network comprises a number of bistable multivibrators or flip-flops $F_1 - F_4$, $F_7$ and $F_{10} - F_{13}$, several monostable multivibrators or monoflops $F_5$, $F_6$, $F_8$, $F_9$, binary pulse counters $PC_1 - PC_4$, AND or coincidence gates $AG_1 - AG_{19}$ and $AG_I - AG_{III}$, and OR gates $OG_1 - OG_{11}$, gates $OG_4 - OG_6$ being of the anticoincidence or Exclusive-OR type. AND gates $AG_{16}$ and $AG_{17}$, working into setting inputs of flip-flops $F_{10}$ and $F_{11}$, have inputs connected to respective stage outputs of pulse counter $PC_1$ via a selector circuit SE enabling these connections to be changed at will.

The several multivibrators $F_1 - F_{13}$ have outputs respectively designated $Q_1 - Q_{13}$, the presence of a bar (e.g. $\bar{Q}_{11}$) conventionally indicating a signal which has the binary value "1" in the reset rather than in the set condition of the unit. The output signals of OR gate $OG_1$, AND gate $AG_2$ and OR gates $OG_8$, $OG_3$ have been respectively designated L (for "length"), D (for "doubling" or "overlapping"), H (for "hole"), and T (for "tape" or "extra thickness").

AND gates $AG_5$ and $AG_7$ have output signals $E_a$ and $E_c$ as a possible indication of dog's-ears along the upper edge (scanning line A) or the lower edge (scanning line C), respectively. Capacitors $CA_1$ and $CA_2$ serve for the temporary storage of signals H and T, respectively. A signal $L_1$ in the output of the first stage of counter $PC_1$ marks the beginning of a test cycle.

The following logical equations can be established for binary signals L, D, T and H:

$L = A' + B' + C'$     (1)
$D = B''(A'' + C'')$     (2)
$T = A'' + B''\cdot C''$     (3)
$H = A'\bar{B}' + \bar{A}'B' + A'\bar{C}' + \bar{A}'C' + B'\bar{C}' + \bar{B}'C'$     (4)

According to equation (1), the length of the test specimen is measured as long as paper of at least the requisite minimum thickness is present in zone A, B and/or C. Thus, signals A', B' and C' are logically added in OR gate $OG_1$; the coincidence of signal L with a gating pulse Z opens the AND gate $AG_1$ to step the pulse counter $PC_1$. The length increments measured by pulses Z may equal, for example, 0.5 mm. With a counting capacity on the order of 1,000 pulses, counter $PC_1$ may measure lengths up to about 50 cm.

The setting of flip-flop $F_{10}$ by the output of AND gate $AG_{16}$ indicates, by the appearance of the signal $Q_{10}$, that the specimen is longer than the standard. Unless flip-flop $F_{11}$ is set after having been reset by signal $L_1$ at the beginning of a cycle, signal $\bar{Q}_{11}$ remains in existence to the end of the cycle to indicate an undersized bill.

Equation (2) is satisfied by logically adding the signals A'' and C'' in OR gate $OG_2$ and feeding the output thereof to AND gate $AG_2$ along with signal B''. Thus, signal D in the output of the latter gate signifies double thicknesses in at least two adjoining scanning zones A, B or B, C, i.e., over the major part of the width of the specimen; this is taken as an indication of overlap. In the presence of a gating pulse Z, signal D passes the AND gate $AG_3$ to step the counter $PC_2$; if the overlap is confirmed by a sufficient number of measurements as determined by that counter, AND gate $AG_{18}$ conducts to set the flip-flop $F_1$ with generation of output signal $Q_1$.

An excess thickness or adhesive tape is detected, according to equation (3), by the output of OR gate $OG_3$ receiving the signals A'', B'' and C''. Signal T steps the counter $PC_3$ in the presence of any gating pulse Z opening the AND gate $AG_4$; the conduction of AND gate $AG_{19}$, in response to a predetermined number of such steppings, sets the flip-flop $F_2$ to generate the damage signal $Q_2$.

A hole or gap manifests itself, pursuant to equation (4), by an output of Exclusive-OR gate $OG_4$ receiving the signals A' and B', Exclusive-OR gate $OG_5$ receiving the signals A' and C', or Exclusive-OR gate $OG_6$ receiving the signals B' and C', all these Exclusive-OR gates working into the OR gate $OG_9$. Counter $PC_4$ is stepped by the signal H, upon the unblocking of AND gate $AG_6$ by a gating pulse Z, and causes the setting of flip-flop $F_3$ on a relatively high count (via AND gate $AG_{14}$) as well as of flip-flop $F_4$ on a relatively low count (via AND gate $AG_{15}$), thereby generating respective output signals $Q_3$ and $Q_4$ whose significance will be explained below.

The existence of a dog's-ear at a corner of specimen 6 is suggested by the immediate succession of signals H and T in either sequence. Thus, a dog-earred upper corner at leading edge 6' (FIG. 1) can be represented as a binary signal $E_a'$, with signal $E_c'$ denoting a dog-eared lower corner at the same edge whereas signals $E_a''$ and $E_c''$ respectively indicate dog's-ears at the upper and lower corners of trailing edge 6''. These signals can be expressed by the following logical equations:

$E_a' = \Delta[\bar{A}'(B' + C')]\cdot A''(B'' + C'')$     (5)
$E_a'' = \Delta[\bar{A}''(B' + C'')]\cdot \bar{A}'(B' + C')$     (6)
$E_c' = \Delta[\bar{C}'(A' + B')]\cdot C''(A'' + B'')$     (7)
$E_c'' = \Delta[C''(A'' + B'')]\cdot \bar{C}'(A' + B')$     (8)

The symbol $\Delta$ in the foregoing equations indicates that the corresponding logical product within square brackets is delayed to coincide with the logical product outside these brackets. In FIG. 7 this delay is brought about by the capacitors $CA_1$ and $CA_2$ which store the signals H and T for a few scanning intervals, i.e., recurrence periods of pulses Z. In the presence of either of these signals, OR gate $OG_9$ conducts and on the trailing edge of its output pulse trips the monoflop $F_8$ (of adjustable off-normal period) whose output pulse $Q_8$, in turn, by its trailing edge trips the mono-flop $F_9$ in cascade therewith. The output $Q_9$ of the latter, following upon the detection of any hole or excess thickness, resets the counters $PC_2$ and $PC_4$ as well as the flip-flops $F_2$, $F_4$ and $F_7$.

A coincidence of a stored signal H with a signal T, or of a stored signal T with a signal H, energizes the AND gate $AG_{10}$ which works into one input of AND gate $AG_{11}$ whose other input receives the "reset" output signal $\bar{Q}_7$ of flip-flop $F_7$. An output signal from AND gate $AG_{11}$ sets the flip-flop $F_{12}$ whose output signal $Q_{12}$ reaches one input of AND gate $AG_{13}$; the other input of the latter gate is energized by the output signal $Q_8$ of monoflop $F_8$ upon detection of a flaw (signal $H$ or $T$). Conduction of AND gate $AG_{13}$ sets the flip-flop $F_{13}$ to generate an output signal $Q_{13}$.

Signals $A'$, $B'$ and $C'$ are applied to inverting inputs of AND gate $AG_8$ to indicate, by their simultaneous disappearance, the end of the specimen being tested. Gate $AG_8$ thereupon trips the monoflop $F_5$ whose output $Q_5$, by its trailing edge, trips the monoflop $F_6$ in cascade therewith to generate a resetting signal $Q_6$ for counters $PC_1$ and $PC_3$ as well as flip-flops $F_1$, $F_3$, $F_{10}$ and $F_{13}$. Element $AG_8$ is the equivalent of a NOR gate.

AND gate $AG_5$ has an inverting input for the signal $A'$ and a noninverting input for the signal $H$, thus generating a signal $E_a$ whenever there is a gap along the upper zone A. Similarly, AND gate $AG_7$ has an inverting input for signal $C'$ and a noninverting input for signal $H$ to generate a signal $E_c$ in the presence of a gap along the lower zone C. If such a gap occurs at the leading edge $6'$, indicating a possible dog's-ear, the two inputs of AND gate $AG_9$ are simultaneously energized by the output of OR gate $OG_8$, receiving the signals $E_a$ and $E_c$, and by the start pulse $L_1$ from the first stage of counter $PC_1$. This sets the flip-flop $F_7$ and, at its output $\bar{Q}_7$, de-energizes one of the inputs of AND gate $AG_{11}$ which therefore cannot conduct even if AND gate $AG_{10}$ responds to the consecutive presence of a hole and an excess thickness. Thus, a dog's-ear at a leading corner does not result in a setting of flip-flop $F_{12}$ so that no output signal $Q_{13}$ is generated; however, if that dog's-ear is very large, AND gates $AG_{14}$ and/or $AG_{19}$ will conduct to set the corresponding flip-flops $F_3$, $F_2$ with generation of signals $Q_3$ and/or $Q_2$.

If flip-flop $F_7$ is not set at the time of energization of AND gate $AG_{10}$, AND gate $AG_{11}$ conducts and sets the flip-flop $F_{12}$. The condition of this flip-flop is checked by the output signal $Q_8$ of monoflop $F_8$ upon the disappearance of the irregularity; however, if this irregularity is a dog's-ear at one of the trailing corners, the output signal $Q_5$ of monoflop $F_5$ unblocks the AND gate $AG_{12}$ for the passage of the output signal of OR gate $OG_8$ so that flip-flop $F_{12}$ is reset and output signal $Q_{12}$ is terminated before the other input of AND gate $AG_{13}$ is energized by monoflop output $Q_8$.

Signals $Q_{10}$ and $\bar{Q}_{11}$, indicative of an off-size, are passed through OR gate $OG_{10}$ to AND gate $AG_{II}$ together with the output $Q_3$ of flip-flop $F_3$ indicating a large gap, e.g. as caused by a specimen which is narrower than the standard so that thickness zero is sensed along one of its longitudinal edges. Signals $Q_2$ (indicative of a substantial amount of adhesive tape or the like) and $Q_4$ (showing at least one wide gap) are fed through OR gate $OG_{11}$ to AND gate $AG_{III}$ along with the output $Q_{13}$ of flip-flop $F_{13}$, the latter signaling the existence of a tear and a double thickness at some intermediate location. Signal $Q_1$, reporting a presumed overlap, goes directly to AND gate $AG_I$. The three output gates $AG_I$, $AG_{II}$ and $AG_{III}$, respectively energizing the leads $17_I$, $17_{II}$ and $17_{III}$, are opened by the output signal $Q_6$ of monoflop $F_6$ before the resetting of any flip-flop $F_1 - F_4$, $F_{10}$, $F_{11}$ or $F_{13}$. Thus, the routing switches 17 (FIG. 1) are operated in accordance with the detected irregularities.

We claim:

1. A method of testing specimens of sheet material against a standard, comprising the steps of successively measuring the thickness of a test specimen at a multiplicity of closely spaced locations along at least one scanning line between opposite edges thereof, comparing the measured thickness with a reference value at each of said locations, correlating the results of comparison to establish a pattern of distribution of positive and negative deviations of said measured thickness from said reference value along said scanning line, and classifying the test specimen according to the distribution pattern thus obtained.

2. A method as defined in claim 1 wherein the test specimen is classified according to the number of deviations of either sign along said scanning line.

3. A method as defined in claim 1 wherein the test specimen is classified according to the correlation between deviations measured along different, parallel scanning lines.

4. A method as defined in claim 1 wherein said reference value has an upper and a lower tolerance limit, said deviations being determined by comparison with said tolerance limits.

5. A method as defined in claim 1 wherein said reference value is derived from thickness measurements of a standard specimen scanned concurrently with the test specimen.

6. A system for testing specimens of sheet material against a standard, comprising:
   thickness-gauging means positioned for coaction with a test specimen;
   transport means for relatively displacing said thickness-gauging means and said test specimen along at least one scanning line extending from a leading edge to a trailing edge of the latter;
   timing means establishing a multiplicity of successive incremental periods during a traverse of said thickness-gauging means from said leading edge to said trailing edge;
   logical circuitry connected to said thickness-gauging means and to said timing means for storing data on deviations of the thickness of said test specimen from a reference value during any of said incremental periods throughout said traverse; and
   discriminating means connected to said logical circuitry for classifying said test specimen according to the pattern of distribution of its thickness deviations from said reference value along said scanning line.

7. A system as defined in claim 6 wherein said thickness-gauging means comprises at least one electromechanical pressure sensor engageable with said test specimen.

8. A system as defined in claim 7 wherein said pressure sensor comprises a leaf spring, mounting means clamping one end of said leaf spring, the other end of said leaf spring being provided with a specimen-engaging formation remote from said mounting means, and transducer means operatively coupled with said leaf spring for translating a deflection thereof from a normal position into a bipolar electrical signal.

9. A system as defined in claim 6 wherein said thickness-gauging means comprises a plurality of electromechanical pressure sensors spaced apart transversely to the direction of relative displacement of said test specimen for scanning same along parallel lines.

10. A system as defined in claim 6, wherein said timing means comprises an emitter of equispaced gating pulses, said logical circuitry including counting means for said gating pulses.

11. A system as defined in claim 6 wherein said thickness-gauging means comprises a plurality of sensors positioned to coact with said test specimen along parallel scanning lines, said logical circuitry including coincidence and anticoincidence gates connected to said sensors for establishing correlation between thickness measurements taken along different scanning lines.

12. A system as defined in claim 6 wherein said thickness-gauging means includes threshold means for comparing the thickness of said test specimen with two range limits, said threshold means being adapted to emit different types of signals during any incremental period according to the outcome of the comparison, said logical circuitry including separate storage means for said different types of signals connected to said discriminating means.

13. A system as defined in claim 12 wherein said separate storage means comprise a plurality of pulse counters.

14. A system for testing specimens of sheet material against a standard, comprising:
- at least one electromechanical pressure sensor engageable with a test specimen, said pressure sensor including a leaf spring, mounting means clamping one end of said leaf spring, the other end of said leaf spring being provided with a specimen-engaging formation remote from said mounting means, and transducer means operatively coupled with said leaf spring for translating a deflection thereof from a normal position into a bipolar electrical signal;
- transport means for relatively displacing said pressure sensor and said test specimen along a scanning line extending from a leading edge to a trailing edge of the latter;
- timing means establishing a succession of incremental periods during a traverse of said pressure sensor from said leading edge to said trailing edge;
- a source of reference voltage for the thickness of said test specimen;
- comparison means connected to said pressure sensor and to said source for determining deviations of said signal from said reference voltage during any of said incremental periods; and discriminating means connected to said comparison means and to said timing means for classifying the test specimen according to the distribution of said deviations.

15. A system as defined in claim 14 wherein said transducer means comprises a piezoelectric element.

16. A system as defined in claim 15 wherein said piezoelectric element is secured to said mounting means and bears upon one face of said leaf spring adjacent said one end thereof, said mounting means forming an abutment bearing upon the opposite face of said leaf spring at a point longitudinally offset from said piezoelectric element.

17. A system as defined in claim 16 wherein said abutment and said piezoelectric element are relatively adjustable on said mounting means in the longitudinal direction of said leaf spring.

18. A system as defined in claim 17 wherein said transducer means further comprises an analog/digital converter in series with said piezoelectric element.

19. A system as defined in claim 14 wherein said transducer means comprises a mirror carried on said leaf spring, an emitter of luminous radiation trained upon said mirror, and receiving means for radiation reflected by said mirror.

20. A system as defined in claim 19 wherein said emitter is a laser, said receiving means comprising an interferometer.

21. A system as defined in claim 20 wherein said receiving means comprises a forward/backward counter for output pulses emitted by said interferometer.

22. A system as defined in claim 14 wherein said transport means includes a rotatable cylinder supporting said test specimen, said formation bearing upon said cylinder through said test specimen.

23. A system as defined in claim 22 wherein said transport means further includes at least one pair of endless bands sandwiching a narrow zone of said test specimen between them, one of said bands contacting said cylinder.

24. A system as defined in claim 23 wherein said endless bands form two pairs engaging respective longitudinal edges of said test specimen.

* * * * *